United States Patent

[11] 3,542,430

| [72] | Inventor | Daniel K. Mavroff |
| | | 17565 Oak Park Row, Brookfield, |
| | | Wisconsin 53005 |
| [21] | Appl. No. | 756,994 |
| [22] | Filed | Sept. 3, 1968 |
| [45] | Patented | Nov. 24, 1970 |

[54] TILT BED TRAILER SAFETY HITCH
4 Claims, 5 Drawing Figs.

[52] U.S. Cl. ........................................... 298/38, 298/17
[51] Int. Cl. ........................................ B60p 1/00
[50] Field of Search .................................. 298/5, 38, 23; 214/506

[56] References Cited

UNITED STATES PATENTS

| 1,834,965 | 12/1931 | Osman | 298/38X |
| 2,225,522 | 12/1940 | Keith | 298/5 |
| 2,401,660 | 6/1946 | Penny | 298/38 |
| 3,117,820 | 1/1964 | Toland | 298/38 |
| 3,236,563 | 2/1966 | Ripper | 298/38 |

FOREIGN PATENTS

| 50,269 | 10/1939 | France | 298/38 |

Primary Examiner—Richard J. Johnson
Attorney—Andrus, Sceales, Starke & Sawall

ABSTRACT: An improved tilt bed trailer safety hitch for tilt bed trailers which are used to transport construction vehicles between job sites. Only a single operator is required to load and unload the trailer. A spring-loaded trip lever is normally biased to engage a cam which locks the forward end of the tilt bed in a horizontal "travel" position. To unlock the tilt bed for unloading, a steel pin is provided which is wedged between the trip lever and the cam to allow rotation of the cam during unloading and to permit tilting of the tilt bed. Only a single operator is necessary for each load and unload operation, and the tilt bed locks into the safety hitch automatically when the construction vehicle is reloaded on the tilt bed.

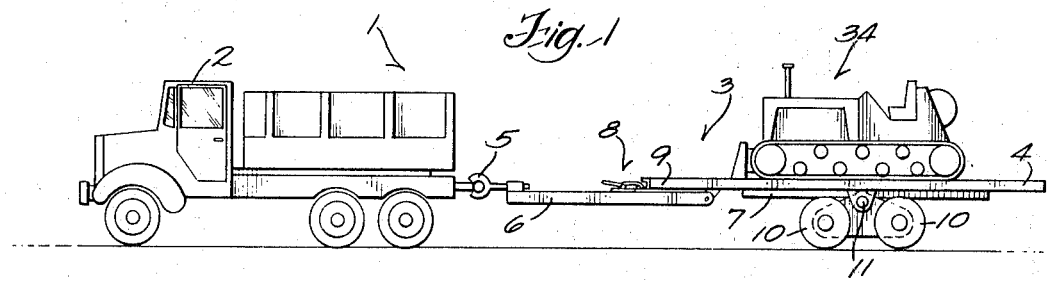
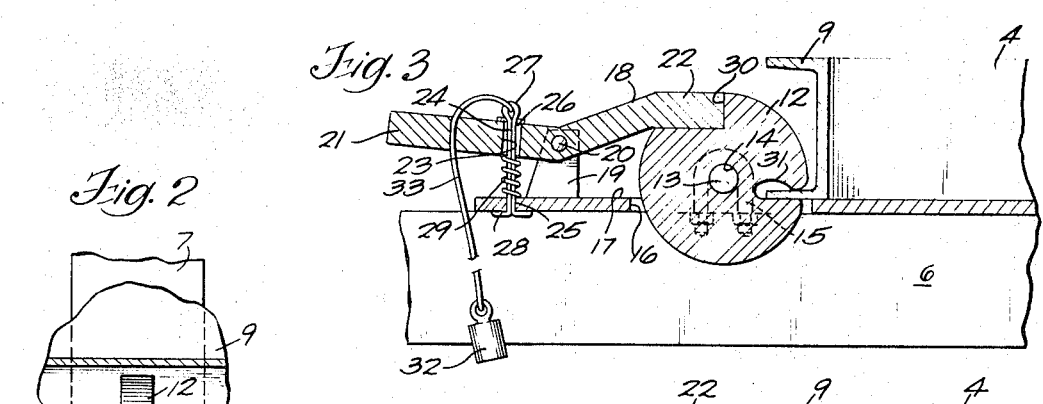

TILT BED TRAILER SAFETY HITCH

This invention provides a simple, improved safety hitch for a tilt bed trailer used to haul a road construction vehicle. This equipment requires only a single operator to unlock the safety hitch just prior to unloading the vehicle from the tilt bed. When the road equipment is reloaded, the construction vehicle is simply driven up the tilted portion of the trailer, and the bed pivots downwardly until the inner end of the tilt bed engages the locking cam of the safety hitch to rotate it and bring the trip lever into locking engagement with the cam.

Various types of hitches for tilting bed trailers have been proposed in the past. For example U.S. Pat. No. 2,225,522 shows a trailer hitch for a dump bed trailer. This particular apparatus, however, requires two operators, one to hold the latch bar 22 in the open position, and another to tilt the dump bed to the unload position. This procedure must be repeated when the dump bed is rotated to the horizontal, travel position. U.S. Pat. No. Re. 22,955, dated Dec. 30, 1947, shows a dump truck latch mechanism which includes a hydraulic valve unit to raise and lower the dump bed of a dump truck. This patent is not similar to the type of tilt bed trailer contemplated by applicant. In the instant invention, movement of the mass, a transported road construction vehicle, is the means which actuates and causes the rotation of the safety hitch cam by pivoting the tilt bed of the trailer.

U.S. Pat. No. 3,236,563 describes an elastic rubber locking device for a tilting dump truck. This latter apparatus is said to be particularly adapted for use with singleside and multiside tippers having toggle lever catches, and the main purpose of the device is to prevent joggling of the tilting dump bed during transport. As pointed out in the last-mentioned patent specification, the locking device is automatically disengaged when the locking forces are reduced, and after 30 to 40 millimeters loading drop of the superstructure.

Inventor's safety hitch is unlike any of those described above, and it is particularly adapted for use with a tilt bed trailer used to transport mobile road construction equipment between job sites. This safety hitch can be operated by the operator of the transport vehicle, and the same operator can load and unload the road equipment unassisted, and return the complete assembly to a staging yard.

The safety hitch of the invention has positive locking action to retain the tilt bed of the trailer in a locked, horizontal travel position during transport, and the operator can easily unlock the spring-biased trip lever from the locked position by simply inserting a steel pin between the trip lever and the locking cam. The operator then moves the transported construction vehicle to the rear of the tilt bed, beyond its fulcrum, and the bed tilts downwardly to the ground, while simultaneously rotating the locking cam counterclockwise (when viewed from the left side of the trailer). The operator then moves the construction vehicle down off the trailer, and the tilt bed can be left in the tilted position. When the work is completed, and it is necessary to reload the construction vehicle on the trailer, it is only necessary for the operator to drive the construction vehicle up the ramp formed by the tilt bed, past the fulcrum point, and the tilt bed lowers automatically and simultaneously rotates the cam in the opposite, clockwise direction. The trip lever then locks the cam into the travel position automatically. The steel-cocking pin for the trip lever is held captive on the safety hitch apparatus by means of a chain or some similar device. When the operator presses down on the forward end of the trip lever, the rear end of the trip lever pivots out of the locking notch of the cam, and the steel pin is inserted between the rear end of the trip lever and the locking notch. This prevents the trip lever from relocking the rotatable locking cam, and the locking cam can rotate counterclockwise to allow tilting of the tilt bed for unloading. As the tilt bed starts to tilt and the locking cam starts to rotate, the steel pin falls out due to gravity. Pivoting of the tilt bed to the horizontal travel position rotates the locking cam in a clockwise direction, and, when the tilt bed is completely horizontal, the trip lever falls back into the locking notch of the locking cam to securely hold the tilt bed for travel.

The preferred method of carrying out the invention is illustrated in the following detailed description and drawings, in which:

FIG. 1 is an overall side plan view of a tilt bed trailer incorporating the apparatus of the invention;

FIG. 2 is an enlarged top plan view with parts broken away showing the safety hitch;

FIG. 3 is an enlarged side-sectional view of the apparatus of the invention with parts broken away and showing the hitch in the locked travel position;

FIG. 4 is similar to FIG. 3, but shows the safety hitch in the cocked position; and FIG. 5 is similar to FIG. 3 and 4, with the hitch shown in the unload position.

The overall assembly in which the invention finds its most useful application is illustrated in FIG. 1. As shown there, a tractor trailer assembly 1 comprises a tractor 2, which may be any form of pulling vehicle, including a dump truck, coupled to a trailer 3 having a tilt bed 4. The tractor 2 is connected to the trailer 3 by means of a trailer hitch 5. Hitch 5 is of any conventional type, such as a pintle, hook and eye hitch. The trailer 3 includes a trailer tongue 6 which extends forwardly of the main trailer bed 7. The trailer tongue 6 provides a mounting means for the trailer hitch 5 and for a safety hitch assembly 8. The normally horizontal tilt bed 4 is pivotally mounted on the main trailer bed 7, and includes a forward end 9, which is disposed to engage the safety hitch assembly 8.

FIGS. 2—4 of the drawings show the safety hitch assembly 8 in detail, its various operating positions, and its interaction with the tilt bed 4. The safety hitch assembly 8, in combination with interacting tilt bed 4, is the main substance of applicant's invention.

The main trailer bed 7 is supported by two pairs of conventional trailer wheels 10, as best seen in FIG. 1 of the drawings. The rear pair of wheels 10 are set sufficiently forward under the main trailer bed 7 to allow the tilt bed 4 to pivot about its fulcrum 11 from the unload position to the travel position, and vice versa.

The forward end 9 of the tilt bed 4 coacts with the safety hitch assembly 8 by means of a freely rotatable annular locking cam 12, which is pivotally mounted on the trailer tongue 6. A cam axle support 13 extends through an axial opening 14 in the locking cam 12, and is secured to the trailer tongue 6 by means of a pair of U-bolts 15. An opening 16 in the top surface 17 of the trailer tongue 6 provides sufficient space for the locking cam 12 to freely rotate when moved by the forward end 9 of the tilt bed 4.

The safety hitch assembly 8 also includes a trip lever 18, pivotally mounted on a pivot block 19, on a trip lever pivot axle 20. Pivot block 19 is welded or otherwise secured to the trailer tongue 6. The trip lever 18 includes a forward end 21 and a slightly raised rearward end 22. The forward end 21 is normally disposed sufficiently above the level of the trailer tongue 6 to allow application of a downward force to pivot the rearward end 22 of the trip lever 18 up out of the locking cam 12.

The trip lever 18 has a vertical opening 23 intermediate the forward end 21 and the trip lever pivot axle 20. A long stem cotter pin 24 is received in and extends through, the vertical opening 23. The pin 24 also extends through a second vertical opening 25 in the trailer tongue 6. A first restraining washer 26 is provided surrounding the cotter pin 24 between the upper surface of the trip lever 18 and enlarged head 27 of the cotter pin 24. Lower end 28 of the cotter pin 24 is spread apart, so that the cotter pin 24 is restrained between the trip lever 18 and the trailer tongue 6 for limiting the upward pivotal travel of the trip lever 18. A compressible spring 29 is disposed around the cotter pin 24 between the trip lever 18 and the trailer tongue 6 and urges the end 22 of the trip lever 18 into locking engagement with locking notch 30 of the locking cam 12.

The locking notch 30 normally receives the rearward end 22 of the trip lever 18 when the tilt bed is in the locked travel position, as best seen in FIG. 3 of the drawings. A hold recess slot 31 is also provided in the rotatable locking cam 12 to receive the forward end 9 of the tilt bed 4 as seen in FIG. 3, and is circumferentially spaced from notch 30. In the normal travel position, the trip lever 18 fits into the locking notch 30 of the locking cam 12 to prevent any rotation of the locking cam 12 during travel.

A short steel pin 32 is provided for insertion between the rear end 22 of the trip lever 18 and the locking notch 30 of the locking cam 12. The steel pin 32 is connected to the head 27 of the cotter pin 24 by means of a chain 33 to prevent loss of the steel pin 32 during normal travel. Any convenient spacer means can be used instead of pin 32. For example, a stone from the job site of the correct dimensions can be used.

As seen in FIG. 4, the operator pushes down on the forward end 21 of the trip lever 18 and simultaneously inserts the steel pin 32 in the locking notch 30. This effectively cocks the locking cam 12 and puts the tilt bed in the ready position for unloading, the locking cam 12 being unlocked and free to rotate in a counterclockwise direction (when viewed as illustrated in the drawings). The operator then mobilizes construction vehicle 34, which is resting on the tilt bed 4, and moves it rearwardly past the fulcrum 11, thereby raising the front end 9 of the tilt bed 4. This action rotates the locking cam 12 counterclockwise, as best seen in FIG. 5, and the steel pin 32 falls from the locking notch 30.

When the forward end of the tilt bed 4 is clear of the holding slot 31, the locking cam 12 ceases rotation and the tilt bed pivots to the ground so that the vehicle 34 can be driven down off the tilt bed 4 for use in construction work. The tilt bed 4 normally remains in the tilted position until reloading, and the cam 12 also remains in the position shown in FIG. 5 of the drawings until reloading.

When it is desired to reload the vehicle 34 onto the trailer 3, it is only necessary that the operator drive the vehicle 34 back up onto the tilt bed 4, forward of the fulcrum 11. This action causes the tilt bed to pivot downwardly and forwardly, so that the forward end 9 of the tilt bed 4 engages the hold slot 31 of the locking cam 12, rotating it clockwise back into the locked travel position. When the locking cam 12 has rotated to the travel position, the trip lever 18 is urged into the locking notch 30 to automatically lock the cam 12 and the tilt bed in position for transport of the road construction vehicle 34 to another job site, or back to a staging yard.

The invention also has application to other vehicles, such as boats, snowmobiles and race cars, which could be transported on a trailer incorporating the safety hitch of the invention. The safety hitch assembly 8 can also be used for other purposes where a pivoting member, such as the tilt bed 4, is used. For example, an operating rope 35 can be attached to the end of the trip lever 18, as shown in FIG. 5, so that the locking cam 12 can be released remotely. A second operating rope 36 for the tilt bed 4 can be included for remote operation of the bed 4. Conceivably, the hitch assembly 8 could then be used in combination with a retractable basketball backboard. In such an application, the operating rope 35 could be pulled from the floor to release the trip lever 18 and the locking cam 12 to permit the tilt bed 4 to pivot downwardly to a vertical position in which it could be used as a basketball backboard. To retract the bed 4, a downward force can be applied at the end 9 of the bed 4 as by the second operating rope 36. Some of the advantages of the safety hitch in this application are slightly different than for use in connection with a tilt bed trailer, but, in both cases, the hitch latches automatically, and forms a safe, mechanical latch until the trip lever 18 is released. It is not necessary to rely on the ropes to hold the bed 4 (backboard) in the horizontal position, because the hitch assembly 8 and more particularly the locking cam 12 and trip lever 18 takes the load. Other applications, such as for locking folding booms on cranes, are apparent.

In summary, the tilt bed safety hitch of this invention provides a simple and sure means of positively locking a tilt bed in position, and provides a convenient means for disengaging the locking assembly so that the bed can be tilted. One advantage of this invention is that a single operator can lock and unlock the safety hitch remotely. The versatility of the safety hitch is particularly attractive for transporting road construction equipment, because, in many cases, the road construction vehicle operator is an independent contractor with expensive capital equipment usable only during a limited construction season. In this type of operation, every minute of good construction weather is extremely valuable, and the safety hitch of this invention makes it possible to save man-hours, and perform the load and unload operation without assistance.

I claim:
1. A self-locking safety hitch for a tiltable member having an end portion, comprising:
   a. an annular locking cam;
   b. means mounting said cam for free rotation adjacent said end portion;
   c. said cam having a recess therein for receiving said end portion when said tiltable member is in normal untilted position;
   d. a pivotally mounted trip lever disposed adjacent said cam;
   e. said cam having a notch therein, said notch being spaced circumferentially from said recess and adapted to receive said lever to lock said cam against rotation when said tiltable member is in said normal position with the end portion thereof disposed within said recess;
   f. biasing means for releasably urging said lever into engagement with said notch; and
   g. the construction being such that, when said lever is released from said notch, tilting of said member will cause said end portion to rotate said cam.

2. For use with a transport vehicle, the combination comprising:
   a. a tongue adapted to be attached to the rear of the vehicle;
   b. a tiltable deck having a front end portion; and
   c. a hitch for releasably securing said deck in horizontal position to said tongue, said hitch comprising:
      1. an annular locking cam mounted for free rotation on said tongue adjacent said front end portion;
      2. said cam having a slot thereon for receiving said front end portion when said deck is in horizontal position;
      3. a pivotally mounted trip lever disposed forwardly of said cam;
      4. said cam having a notch thereon, said notch being spaced circumferentially from said slot and adapted to receive said lever to lock said cam against rotation when said deck is in said horizontal position with the end portion thereof disposed within said slot;
      5. biasing means for releasably urging said lever into engagement with said notch; and
      6. the construction being such that, when said lever is released from said notch, tilting of said deck relative to said tongue will cause said front end portion to rotate said cam.

3. The combination of claim 2 which includes means insertable between said trip lever and the notch of said cam to hold said lever in released position when said bed is horizontal.

4. The combination of claim 2 in which said biasing means comprises a spring mounted between said tongue and said lever.